United States Patent [19]

Hoang

[11] Patent Number: 5,192,955
[45] Date of Patent: Mar. 9, 1993

[54] INDIVIDUAL TARGET ANGLE MEASUREMENTS IN A MULTIPLE-TARGET ENVIRONMENT

[75] Inventor: Bao N. Hoang, Laguna Hills, Calif.

[73] Assignee: Hughes Aircraft Company, Los Angeles, Calif.

[21] Appl. No.: 765,346

[22] Filed: Sep. 25, 1991

[51] Int. Cl.$^5$ ............................................. G01S 13/44
[52] U.S. Cl. ...................................... 342/80; 342/149
[58] Field of Search ................................. 342/80, 149

[56] References Cited

U.S. PATENT DOCUMENTS

| | | | |
|---|---|---|---|
| 3,378,843 | 4/1968 | Sherman | 342/149 |
| 3,952,304 | 4/1976 | Broniwitz et al. | 342/80 X |
| 4,646,095 | 2/1987 | Kanter | 342/149 X |

*Primary Examiner*—T. H. Tubbesing
*Attorney, Agent, or Firm*—Leonard A. Alkov; Wanda K. Denson-Low

[57] ABSTRACT

A target tracking system and methods that can isolate and maintain stable track on a selected target in a multiple-target environment. In multiple-target environments, the signal returns received at the sum and difference channels are composites of individual targets. By decomposing received signals into individual components, angle measurements to each target are computed, and consequently, a specified target is isolated and accurately tracked in a stable manner. The present invention provides for apparatus and methods that compute angle measurements to each individual airborne target in a multiple target environment. The composite return signals from a number of targets that are closely spaced in Doppler are decomposed into their individual components, and hence, tracking measurements to each target are obtained without interference from other targets. The present invention may be used to determine the angular position of individual airborne targets within a multiple target environment. The present invention exploits the phase relationship between the sum and difference channel outputs of a single Doppler filter and between the sum channel outputs of two adjacent Doppler filters to decompose composite signal returns of targets into their individual components. Consequently, an independent angle measurement for each target is obtained. In addition, the number of targets with distinct velocities may also be determined. Implementation of the present invention improves the performance of single target tracking in multiple-target environments. Since independent measurement to each target is obtained, accurate and stable track on any target is maintained.

7 Claims, 3 Drawing Sheets

INDIVIDUAL TARGET ANGLE MEASUREMENTS IN A MULTIPLE-TARGET ENVIRONMENT

BACKGROUND

The present invention relates to target tracking, and more particularly, to target angle measurement and tracking apparatus and methods which can isolate and maintain stable track on a selected target in a multiple-target environment.

The closest concept relating to single target tracking in a multiple-target environment comprises a combination of a target angular extent estimation coupled with off-boresight tracking. The target angular extent estimation may be used to detect the presence of multiple targets upon which off-boresight tracking may be commanded to deliberately place the desired target off the antenna boresight in order to put the undesired targets at the antenna null. However, the target angular extent estimation depends strongly on the relative signal strengths of the targets, i.e., multiple targets with a single dominantly strong target will appear as a single target. Off-boresight tracking, while reducing corruption from the undesired targets in measuring angle discriminant to the desired target, is more susceptible to thermal noise as the desired target is placed away from the boresight.

In multiple-target environments, signals received at the sum and difference channels are composites of individual targets. Therefore, using these composite signals results in an angle estimate about the targets' centroid. In addition, depending on their relative phases, these individual signals can add coherently or partially cancel each other, which yields large measurement variance. This results in inaccurate and unstable tracking.

Therefore it would be advantageous to have a target tracking method that independently provides for angle measurements to each individual target, and thus isolates and tracks a specified target in a stable manner.

SUMMARY OF THE INVENTION

In order to provide the above and other features and advantages, the present invention provides for a target tracking system and methods that isolate and track a chosen target in a multiple-target environment without interference from other targets. In multiple-target environments, the return signals received at the sum and difference channels of the radar system are composites of individual targets. By decomposing received signals into individual components, angle measurements to each target are computed, and consequently, a specified target is isolated and accurately tracked in a stable manner.

The present invention provides for a method that computes angle measurements to each individual airborne target in a multiple-target environment. The composite return signals from a number of targets that are closely spaced in Doppler frequency are decomposed into their individual components, and hence, tracking measurements to each target are obtained without interference from other targets.

The present invention may be used to determine the angular position of individual airborne targets within a multiple-target enviroment. The present methods exploit the phase relationship between the sum and difference channel outputs of a single Doppler filter and between the sum channel outputs of two adjacent Doppler filters to decompose composite signal returns of targets into their individual components. Hence, an independent angle measurement for each target is obtained. In addition, the number of targets with distinct velocities may also be determined. Implementation of the present invention improves the performance of single target tracking in multiple-target environments. Since independent measurement to each target is obtained accurate and stable tracking of any target is maintained.

More specifically, the present invention provides for apparatus and methods for tracking a selected target without interference from other targets. The present invention comprises an antenna for receiving sum ($\Sigma$) and difference ($\Delta$) raw data signals indicative of respective directions of a plurality of targets. Targets' frequency spectra are formed using a bank of Doppler filters. These Doppler filters contain the composite sum and difference signals of the targets. An angle processor is provided to decompose the composite sum and difference signals into respective individual components ($\Sigma_1$, $\Delta_1$, $\Sigma_2$, $\Delta_2$), and then use these components to compute respective angles indicative of the angular direction ($\epsilon_1$, $\epsilon_2$) to each of the respective targets. A selection means is provided for selecting a specific target for tracking. A control system is provided that is coupled to the antenna and which may be optionally commanded to steer the antenna toward the selected target.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
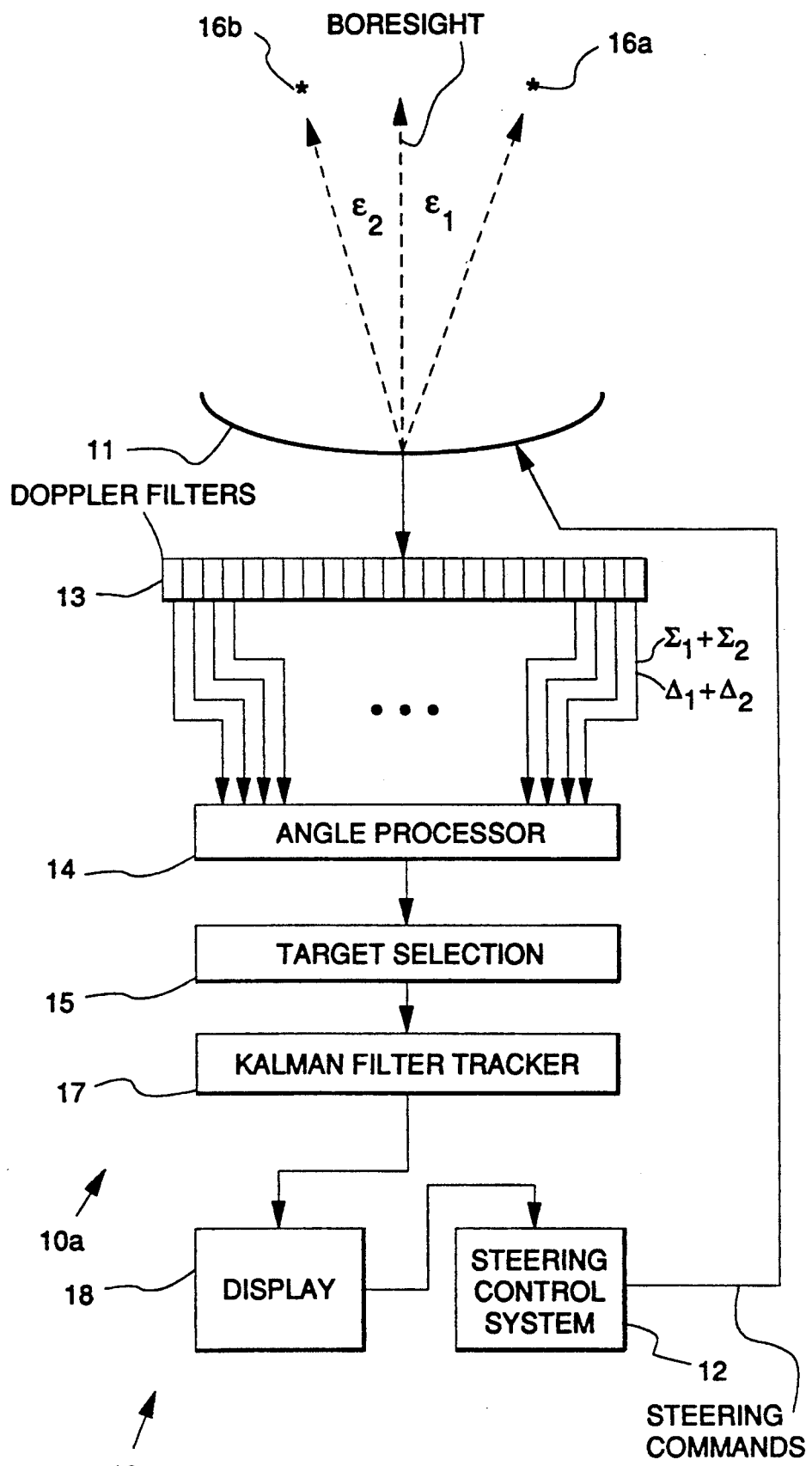
FIG. 1 is a block diagram illustrating a target tracking system in which the methods of the present invention are employed.

Referring to the drawing figures, FIG. 1 is a block diagram illustrating a target tracking system 10 employing the methods of the present invention. The target tracking system 10 comprises a mechanically streerable antenna 11 that is steered using a steering control system 12 coupled thereto. The antenna 11 is coupled to a signal processor 10a which comprises a bank of Doppler filters 13, an angle processor 14, a target selection means 15, and a Kalman filter tracker 17. The signal processor 10a outputs tracked target's parameters which may be displayed to a radar system operator via a display 18. The signal processor 10a outputs angle estimate data indicative of the angular direction to each of the targets 16a, 16b.

In accordance with the principles of the present invention, the signal processor 10a implements methods that are adapted to accurately determine the angular direction to each of the targets 16a, 16b, notwithstanding relatively close angular spacing therebetween. The present methods comprise logic that estimates the respective angles $\epsilon_1$, $\epsilon_2$ to the targets 16a, 16b, and then, depending on the target selection, provides the appropriate angle measurement to the Kalman filter tracker 17 to maintain a stable track on the selected target 16a, 16b.

In a typical angle tracking system, the angle discriminant to a single target is computed using the sum and difference channel outputs of the target Doppler filter 13. Provided that there is sufficient signal-to-noise ratio, excellent tracking accuracy can be maintained. However, in the presence of multiple targets that are closely spaced in Doppler frequency, the return signals are corrupted due to scintillation effects. Depending on their relative phases, these signals can add coherently or partially cancel each other. Hence, it is a principle of the present invention to decompose the targets' composite signals into their individual components to obtain uncorrupted tracking measurements.

Two methods for decomposing the targets' composite sum and difference signals into their individual components may be employed in the present invention. The first method addresses two-target scenarios. The targets 16a, 16b are assumed to be relatively widely separated in angle but closely spaced in Doppler frequency, and have signal power in two adjacent Doppler filters 13. The second method addresses a more general case where an unknown number of targets 16 are present. The targets 16 are assumed to have signal power in a Doppler filter 13 but do not have exactly the same velocities, i.e., two targets 16 with the same velocity are counted as one and the calculated measurements are then relative to their centroid. While the first method assumes only two targets 16 are present, the second method, as a by-product, also determines the number of targets 16 present.

Figure 2:
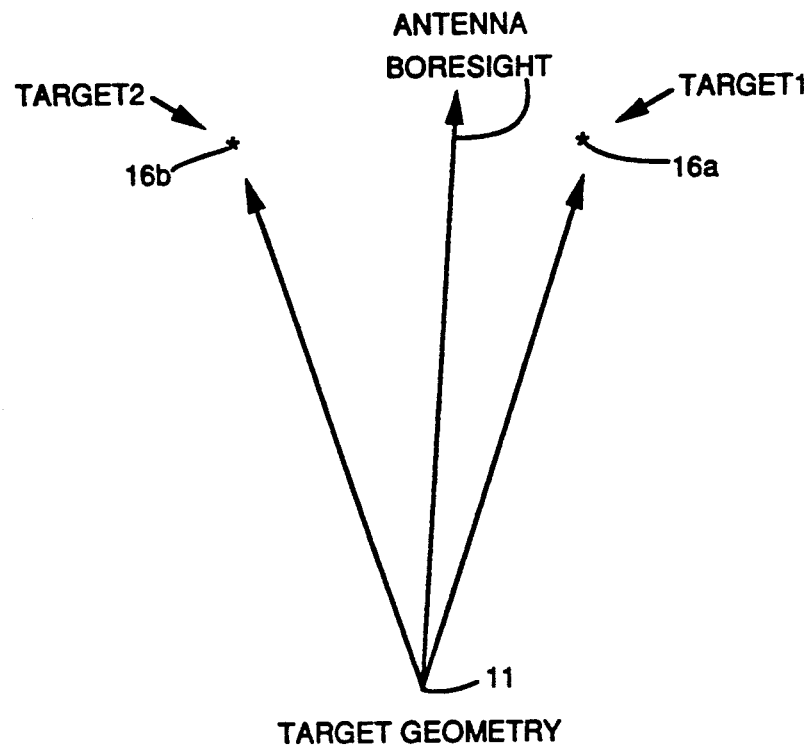
FIG. 2 illustrates the typical target geometry that is useful in explaining the methods of the present invention.
Figure 3:
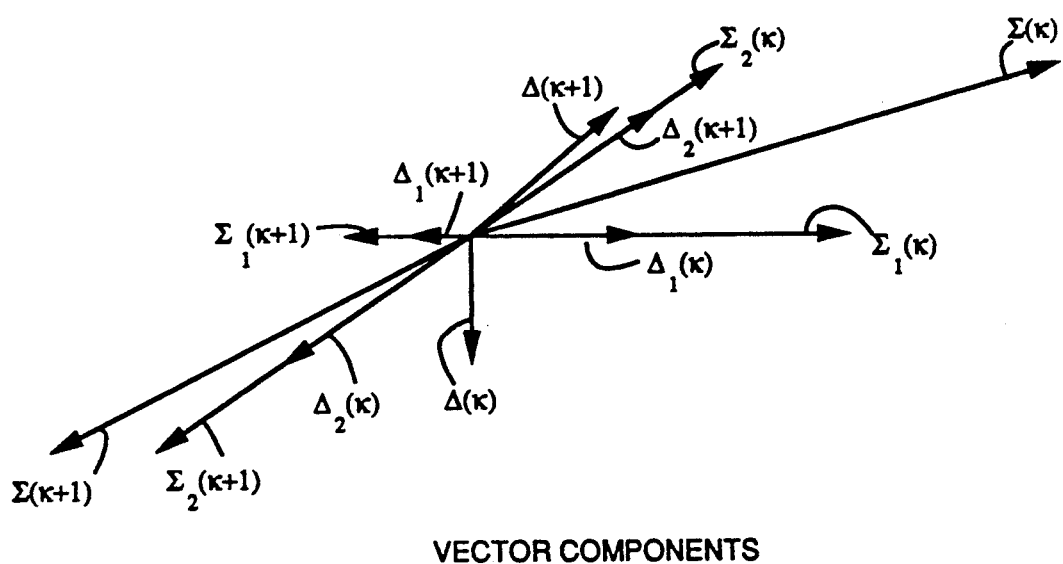
FIG. 3 illustrates vector components derived from the target geometry shown in FIG. 2.

FIG. 2 illustrates the typical target geometry that is useful in explaining the methods of the present invention. FIG. 3 illustrates vector components derived from the target geometry shown in FIG. 2. FIGS. 2 and 3 are referenced below with regard to the derivation of equations utilized in the present methods.

In accordance with the first method of the present invention, the two-target scenario is described below. To facilitate understanding, geometric interpretation is provided whenever appropriate, with particular reference to FIGS. 2 and 3. First, a maximum-likelihood angle discriminant is computed as follows:

$$\text{Disc} = \frac{\Delta_k \cdot \Sigma_k}{\Sigma_k \cdot \Sigma_k}$$

where $\Delta_k$ and $\Sigma_k$ are, respectively, the difference and sum channel outputs of Doppler filter k, and · denotes the dot product operation. Under single target conditions, this discriminant yields the correct angle pointing error to the target. However, when two targets 16a, 16b are present, the discriminant above becomes:

$$\text{Disc} = \frac{(\Delta_k^1 + \Delta_k^2) \cdot (\Sigma_k^1 + \Sigma_k^2)}{(\Sigma_k^1 + \Sigma_k^2) \cdot (\Sigma_k^1 + \Sigma_k^2)}$$

which yields the pointing error to the targets' centroid. Thus, it is desirable to decompose the composite sum and difference signals $\Delta_k$ and $\Sigma_k$ where $$\Delta_k = \Delta_k^1 + \Delta_k^2$$

$$\Sigma_k = \Sigma_k^1 + \Sigma_k^2$$

into their individual components, $\Delta_k^1$, $\Delta_k^2$, $\Sigma_k^1$ and $\Sigma_k^2$, so that angle discriminant of each individual target 16a, 16b may be accurately computed.

It is known that for an individual target 16, the sum and difference channel outputs of the same Doppler filter 13 are either in-phase or 180 degrees out of phase, and the sum channel outputs of two adjacent Doppler filters 13 are approximately 180 degrees out of phase. Thus, the sum and difference signals of Doppler filters k and (k+1) due to target "n" may be written as follows:

$$\Sigma_n(k) = A_n e^{j\phi_n} \qquad \Sigma_n(k+1) = B_n e^{j\phi_n}$$

$$\Delta_n(k) = t_n A_n e^{j\phi_n} \qquad \Delta_n(k+1) = t_n B_n e^{j\phi_n}$$

where $A_n$ and $B_n$ are real numbers and have opposite signs, $t_n$ is real and is the angle discriminant to target "n". The composite signals are then given by:

$$\Sigma(k) = A_1 e^{j\phi_1} + A_2 e^{j\phi_2}$$

$$\Delta(k) = t_1 A_1 e^{j\phi_1} + t_2 A_2 e^{j\phi_2}$$

$$\Sigma(k+1) = B_1 e^{j\phi_1} + B_2 e^{j\phi_2}$$

$$\Delta(k+1) = t_1 B_1 e^{j\phi_1} + t_2 B_2 e^{j\phi_2}$$

These vectors are depicted in FIGS. 2 and 3.

The problem may be stated as follows. Given the sum and difference channel outputs of two adjacent Doppler filters k and (k+1), i.e., $\Sigma(k)$, $\Sigma(k+1)$, $\Delta(k)$, $\Delta(k+1)$, determine $t_n$, $A_n$, $B_n$ and $\phi_n$. This problem is identical to one that uses two adjacent range cells instead of two adjacent Doppler filters 13 since the sum channel outputs of two adjacent range cells are approximately in-phase (in this case $A_n$ and $B_n$ have the same signs).

The solutions to the equations above are obtained using elementary algebra. Let $$\Sigma(k) = a(k) + jb(k)$$

$$\Delta(k) = c(k) + jd(k)$$

and $$\Sigma(k+1) = a(k') + jb(k')$$

$$\Delta(k+1) = c(k') + jd(k')$$

Then the equation above can be written as:

$$a(k) + jb(k) = (A_1 \cos \phi_1 + A_2 \cos \phi_2) + j(A_1 \sin \phi_1 + A_2 \sin \phi_2) \quad (1)$$

$$c(k) + jd(k) = (t_1 A_1 \cos \phi_1 + t_1 A_1 \cos \phi_2) + j(t_1 A_1 \sin \phi_1 + t_2 A_2 \sin \phi_2) \quad (2)$$

$$a(k') + jb(k') = (B_1 \cos \phi_1 + B_2 \cos \phi_2) + j(B_1 \sin \phi_1 + B_2 \sin \phi_2) \quad (3)$$

$$c(k') + jd(k') = (t_1 B_1 \cos \phi_1 + t_2 B_2 \cos \phi_2) + j(t_1 B_1 \sin \phi_1 + t_2 B_2 \sin \phi_2) \quad (4)$$

To determine $t_1$ and $t_2$, multiply equation (1) by $B_2/A_2$ and subtract (3) to obtain:

$$\left\{\left(\frac{B_2}{A_2}\right)a(k) + a(k')\right\} + j\left\{\left(\frac{B_2}{A_2}\right)b(k) + b(k')\right\} = \quad (5)$$

$$\left(\frac{A_1 B_2}{A_2} - B_1\right)(\cos\phi_1 + j\sin\phi_1)$$

Similarly, multiply equation (2) by $B_2/A_2$ and subtract (4) to obtain:

$$\left\{\left(\frac{B_2}{A_2}\right)c(k) + c(k')\right\} + j\left\{\left(\frac{B_2}{A_2}\right)d(k) + d(k')\right\} = \quad (6)$$

$$t_1\left(\frac{A_1 B_2}{A_2} - B_1\right)(\cos\phi_1 + j\sin\phi_1)$$

Equations (5) and (6) imply:

$$t_1 = \frac{m_2 c(k) - c(k')}{m_2 a(k) - a(k')} = \frac{m_2 d(k) - d(k')}{m_2 b(k) - b(k')}$$

where $m_2 = B_2/A_2$. Similarly, $$t_2 = \frac{m_1 c(k) - c(k')}{m_1 a(k) - a(k')} = \frac{m_1 d(k) - d(k')}{m_1 b(k) - b(k')}$$

where $m_1 = B_1/A_1$.

Thus, $m_1$ and $m_2$ are solutions of the equation:

$$\frac{m\, c(k) - c(k')}{m\, a(k) - a(k')} = \frac{m\, d(k) - d(k')}{m\, b(k) - b(k')}$$

or $$(m\, c(k) - c(k'))(m\, b(k) - b(k')) = (m\, a(k) - a(k'))(m\, d(k) - d(k'))$$

Combine terms to obtain a quadratic equation:

$$am^2 + bm + c = 0$$

where $$a = a(k)d(k) - c(k)b(k)$$

$$b = c(k)b(k') - a(k')d(k) + b(k)c(k') - a(k)d(k')$$

$$c = a(k')d(k') - b(k')c(k')$$

The following is done to determine $A_n$, $B_n$ and $\phi_n$. Equate the real and imaginary parts of equation (5) to obtain:

$$\left(\frac{B_2}{A_2}\right)a(k) - a(k') = \left(\frac{A_1 B_2}{A_2} - B_1\right)\cos\phi_1$$

and $$\left(\frac{B_2}{A_2}\right)b(k) - b(k') = \left(\frac{A_1 B_2}{A_2} - B_1\right)\sin\phi_1$$

or $$m_2 a(k) - a(k') = A_1(m_2 - m_1)\cos\phi_1$$
$$m_2 b(k) - b(k') = A_1(m_2 - m_1)\sin\phi_1.$$

Hence, $$\phi_1 = \tan^{-1}\left(\frac{m_2 b(k) - b(k')}{m_2 a(k) - a(k')}\right)$$

and $$A_1 = \frac{m_2 a(k) - a(k')}{(m_2 - m_1)\cos\phi_1} = \frac{m_2 b(k) - b(k')}{(m_2 - m_1)\sin\phi_1}$$

$$B_1 = m_1 A_1 = \frac{m_1 m_2 a(k) - m_1 a(k')}{(m_2 - m_1)\cos\phi_1} = \frac{m_1 m_2 b(k) - m_1 b(k')}{(m_2 - m_1)\sin\phi_1}$$

Similarly, $$\phi_2 = \tan^{-1}\left(\frac{m_1 b(k) - b(k')}{m_1 a(k) - a(k')}\right)$$

and $$A_2 = \frac{m_1 a(k) - a(k')}{(m_1 - m_2)\cos\phi_1} = \frac{m_1 b(k) - b(k')}{(m_1 - m_2)\sin\phi_1}$$

$$B_2 = m_2 A_2 = \frac{m_1 m_2 a(k) - m_2 a(k')}{(m_1 - m_2)\cos\phi_1} = \frac{m_1 m_2 b(k) - m_2 b(k')}{(m_1 - m_2)\sin\phi_1}$$

The existence and multiplicity of the solutions will now be discussed. The quadratic equation $$am^2 + bm + c = 0$$

has two real solutions if
$a \neq 0$ and $b^2 - 4ac \geq 0$.

To simplify notation, note that a complex number $x = \text{Re}(x) + j\text{Im}(x)$ can be considered as a vector lying in the xy-plane in the three-dimensional space:

$$\vec{x} = \text{Re}(x)\vec{i} + \text{Im}(x)\vec{j} + 0\vec{k}$$

Thus, the quantity $\text{Re}(x)\text{Im}(y) - \text{Re}(y)\text{Im}(x)$ is simply the k-component of the cross product:

$$\vec{x} \times \vec{y} = \begin{vmatrix} \vec{i} & \vec{j} & \vec{k} \\ \text{Re}(x) & \text{Im}(x) & 0 \\ \text{Re}(y) & \text{Im}(y) & 0 \end{vmatrix} = [\text{Re}(x)\text{Im}(y) - \text{Re}(y)\text{Im}(x)]\vec{k}$$

The following notation is used:

$$x \times y \equiv \text{Re}(x)\text{Im}(y) - \text{Re}(y)\text{Im}(x) = |x||y|\sin(\phi_y - \phi_x)$$

where $\phi_x$ and $\phi_y$ are the phase angles of x and y, respectively.

The conditions for $a \neq 0$ are as follows.

$$a = a(k)d(k) - c(k)b(k)$$
$$= \Sigma(k) \times \Delta(k)$$
$$= |\Sigma(k)||\Delta(k)|\sin(\phi_{\Delta(k)} - \phi_{\Sigma(k)}).$$

Hence, $a = 0$ if and only if $\Sigma(k) = 0$ or $\Delta(k) = 0$ or $\sin(\phi_{\Sigma(k)} - \Sigma(k)) = 0$.

It is easy to see that the first two conditions are satisfied only if $\Sigma_1(k)$ and $\Sigma_2(k)$ are lying on a straight line in which case the vectors $\Sigma(k)$, $\Sigma(k+1)$, $\Delta(k)$ and $\Delta(k+1)$ also lie on the same straight line. The last condition implies:

$$\sin(\phi_{\Delta(k)} - \phi_{\Sigma(k)}) = 0 \to \phi_{\Delta(k)} = \phi_{\Sigma(k)} + k\pi.$$

i.e., $\Sigma(k)$ and $\Delta(k)$ are aligned. Thus, $$\Delta(k) = \alpha \Sigma(k)$$

where $\alpha$ is a real number. Therefore $$\Delta_1(k) + \Delta_2(k) = \alpha \Sigma_1(k) + \alpha \Sigma_2(k)$$

$$t_1 \Sigma_1(k) + t_2 \Sigma_2(k) = \alpha \Sigma_1(k) + \alpha \Sigma_2(k)$$

or $$(t_1 - \alpha)\Sigma_1(k) + (t_2 - \alpha)\Sigma_2(k) = 0.$$

Since the two targets are separated in angle, the quantities $(t_1 - \alpha)$ and $(t_2 - \alpha)$ cannot both be zero. Hence, the last equation is satisfied only if $\Sigma_1(k)$ and $\Sigma_2(k)$ are lying on a straight line, which then implies that all of the vectors $\Sigma(k)$, $\Sigma(k+1)$, $\Delta(k)$ and $\Delta(k+1)$ are also lying on the same straight line.

Hence, if $\Sigma(k)$ and $\Sigma(k+1)$ are not aligned, then $a \neq 0$. The conditions for $b^2 - 4ac \geq 0$ are as follow.

$$\begin{aligned}
a &= a(k)d(k) - c(k)b(k) \\
&= \Sigma(k) \times \Delta(k) \\
&= \Sigma_1(k) \times \Delta_2(k) + \Sigma_2(k) \times \Delta_1(k) \\
&= t_2 A_1 A_2 \sin(\phi_2 - \phi_1) - t_1 A_1 A_2 \sin(\phi_2 - \phi_1) \\
&= (t_2 - t_1) A_1 A_2 \sin(\phi_2 - \phi_1)
\end{aligned}$$

$$\begin{aligned}
b &= c(k)b(k') - a(k')d(k) + b(k)c(k') - a(k)d(k') \\
&= \Delta(k) \times \Sigma(k+1) - \Sigma(k) \times \Delta(k+1) \\
&= [\Delta_1(k) + \Delta_2(k)] \times [\Sigma_1(k+1) + \Sigma_2(k+1)] \\
&\quad - [\Sigma_1(k) + \Sigma_2(k)] \times [\Delta_1(k+1) + \Delta_2(k+1)] \\
&= \Delta_1(k) \times \Sigma_2(k+1) + \Delta_2(k) \times \Sigma_1(k+1) \\
&\quad - \Sigma_1(k) \times \Delta_2(k+1) - \Sigma_2(k) \times \Delta_1(k+1) \\
&= t_1 A_1 B_2 \sin(\phi_2 - \phi_1) - t_2 A_2 B_1 \sin(\phi_2 - \phi_1) \\
&\quad - t_2 A_1 B_2 \sin(\phi_2 - \phi_1) + t_1 A_2 B_1 \sin(\phi_2 - \phi_1) \\
&= (t_1 - t_2)[A_1 B_2 + A_2 B_1] \sin(\phi_2 - \phi_1)
\end{aligned}$$

$$\begin{aligned}
c &= a(k')d(k') - b(k')c(k') \\
&= \Sigma(k+1) \times \Delta(k+1) \\
&= \Sigma_1(k+1) \times \Delta_2(k+1) + \Sigma_2(k+1) \times \Delta_1(k+1) \\
&= t_2 B_1 B_2 \sin(\phi_2 - \phi_1) - t_1 B_1 B_2 \sin(\phi_2 - \phi_1) \\
&= (t_2 - t_1) B_1 B_2 \sin(\phi_2 - \phi_1)
\end{aligned}$$

Hence, $$\begin{aligned}
b^2 - 4ac &= (t_2 - t_1)^2 \sin^2(\phi_2 - \phi_1) [(A_1 B_2 + A_2 B_1)^2 \\
&\quad - 4(A_1 A_2)(B_1 B_2)] \\
&= (t_2 - t_1)^2 \sin^2(\phi_2 - \phi_1)(A_1 B_2 - A_2 B_1)^2 \\
&\geq 0
\end{aligned}$$

Therefore, the quadratic equation has two real solutions if $\Sigma(k)$ and $\Sigma(k+1)$ are not aligned. Furthermore, these two solutions are distinct if $b^2 - 4ac \neq 0$. Since, the targets 16a, 16b are separated in angle, and $\Sigma(k)$, $\Sigma(k+1)$ are not aligned, $$t_2 - t_1 \neq 0 \text{ and } \sin^2(\phi_2 - \phi_1) \neq 0$$

Thus, $b^2 - 4ac = 0$ only if $$A_1 B_2 - A_2 B_1 = 0 \to \frac{B_1}{A_1} = \frac{B_2}{A_2}$$

Now, the term $|B_n/A_n|$ is the magnitude ratio of the output of Doppler filter $(k+1)$ over the output of Doppler filter $k$ due to target "n". Since the targets 16a, 16b have different velocities, these ratios are not the same. For example, if target 16a is in Doppler filter $k$ and target 16b is in Doppler filter $k+1$, then $|B_1/A_1| < 1$ and $|B_2/A_2| > 1$. Therefore, if $\Sigma(k)$ and $\Sigma(k+1)$ are not aligned, then the quadratic equation has two real distinct solutions.

In accordance with a second method of the present invention, a multiple-target scenario is described below. The existence and multiplicity of the solutions are also discussed. As was described above with reference to the two-target scenario, two targets 16a, 16b residing in adjacent Doppler filters 13 have the following equations:

$$\Sigma(k) = A_1 e^{j\phi_1} + A_2 e^{j\phi_2}$$

$$\Delta(k) = t_1 A_1 e^{j\phi_1} + t_2 A_2 e^{j\phi_2}$$

$$\Sigma(k+1) = B_1 e^{j\phi_1} + B_2 e^{j\phi_2}$$

$$\Delta(k+1) = t_1 B_1 e^{j\phi_1} + t_2 B_2 e^{j\phi_2}$$

These four complex-valued equations in eight unknowns have distinct solutions if the individual targets 16 are not aligned. Following this approach, an N-target (N>2) scenario requires that the targets have significant signal powers spreading across N Doppler filters 13. Because of signal attenuation due to the frequency response of the Doppler filter 13, this is unlikely, especially when N is large. A general solution is presented below. When the general solution is applied for two targets 16a, 16b, the requirement that the targets 16a, 16b are not aligned is no longer necessary. In addition, it is not necessary to know in advance that two and only two targets 16a, 16b are present when using the general solution since, as a by-product, the general solution also determines the number of targets 16 present in the Doppler filter 13.

Let N be an unknown number of targets 16 within the antenna beam. Assuming that the targets 16 have power in Doppler filter "k", but do not have exactly the same velocity. It is desired to determine the number of targets 16, their velocities and off-boresight angles. The targets 16 may appear in different Doppler filters 13 as long as they all have signal power in Doppler filter "k".

The samples received at the sum channel are written as:

$$x_n = X_1 e^{j\omega_1 \Delta T n} + X_2 e^{j\omega_2 \Delta T n} + \ldots + X_N e^{j\omega_N \Delta T n}$$

where $0 \leq n \leq NF - 1$ (NF is the number of samples collected), and $$\omega_i \Delta T = 2\pi \left(-\frac{2}{\lambda}\right) \frac{\dot{R}_i}{PRF} \quad i = 1, 2, \ldots, N$$

Let $\{x_n(i)\}$, $i = 1, 2, \ldots, K$, be the K sub-sequences of $\{x_n\}$, each is of length M and is defined as follows:

$$\{X_n(i): (i-1)M_1 \leq n \leq (i-1)M_1 + M - 1\}$$

where K, M and $M_1$ are chosen such that:

$$K \geq 2N + 1$$

$$(K-1)M_1 + M - 1 \leq NF - 1$$

The sequences $\{x_n(i)\}$ are overlapped if $M_1 < M$. Also, even though the number of targets N is unknown, K may be an arbitrarily large value so that $K > 2N$.

The outputs of the Doppler filter "k" of the M-point weighted FFT of these sequences are as follows:

$$\Sigma_i(k) = \sum_{n=0}^{M-1} X_n(i) w(n) e^{-j\frac{2\pi}{M}kn}$$

$$= X_1 \sum_{n=0}^{M-1} w(n) e^{j\omega_1 \Delta T[n+(i-1)M_1]} e^{-j\frac{2\pi}{M}kn}$$

$$+ X_2 \sum_{n=0}^{M-1} w(n) e^{j\omega_2 \Delta T[n+(i-1)M_1]} e^{-j\frac{2\pi}{M}kn}$$

$$\vdots$$

$$+ X_N \sum_{n=0}^{M-1} w(n) e^{j\omega_N \Delta T[n+(i-1)M_1]} e^{-j\frac{2\pi}{M}kn}$$

$$= e^{j\omega_1 \Delta T(i-1)M_1} X_1 \sum_{n=0}^{M-1} w(n) e^{j\omega_1 \Delta Tn} e^{-j\frac{2\pi}{M}kn}$$

$$+ e^{j\omega_2 \Delta T(i-1)M_1} X_2 \sum_{n=0}^{M-1} w(n) e^{j\omega_2 \Delta Tn} e^{-j\frac{2\pi}{M}kn}$$

$$\vdots$$

$$+ e^{j\omega_N \Delta T(i-1)M_1} X_N \sum_{n=0}^{M-1} w(n) e^{j\omega_N \Delta Tn} e^{-j\frac{2\pi}{M}kn}$$

where $i=1,2,\ldots,K$. Let $$A_m e^{j\phi_m} = X_m \sum_{n=0}^{M-1} w(n) e^{j\omega_m \Delta Tn} e^{-j\frac{2\pi}{M}kn}$$

$$e^{j\phi_m} = e^{j\omega_m \Delta TM_1}$$

for $m=1,2,\ldots,N$. Then the equations above are written as:

$$\Sigma_i(k) = e^{j\phi_1(i-1)} A_1 e^{j\phi_1} + e^{j\phi_2(i-1)} A_2 e^{j\phi_2} + \ldots + e^{j\phi_N(i-1)} A_1 e^{j\phi_N}$$

for $i=1,2,\ldots,K$. To further simplify the notation, let $$a_i = A_i e^{j\phi_i}$$

$$\beta_i = e^{j\phi_i}$$

then, omitting the Doppler filter index (k), the K equations above are written as:

$$\Sigma_1 = a_1 + a_2 + \ldots + a_N$$
$$\Sigma_2 = \beta_1 a_1 + \beta_2 a_2 + \ldots + \beta_N a_N$$
$$\vdots$$
$$\Sigma_i = \beta_1^{i-1} a_1 + \beta_2^{i-1} a_{21} + \ldots + \beta_N^{i-1} a_N$$
$$\vdots$$
$$\Sigma_K = \beta_1^{K-1} a_1 + \beta_2^{K-1} a_{21} + \ldots + \beta_N^{K-1} a_N$$

The problem may be stated as follows. Given $\Sigma_i$, $i=1,2,\ldots,K$, determine N and solve for $a_m$ and $\beta_m$ for $m=1,2,\ldots,N$. The solutions are determined as follows. The first $2L-1$ where $2L<K$ can be written in following matrix form:

$$V^T A V = \Sigma$$

$$V = \begin{bmatrix} 1 & \beta_1 & \beta_1^2 & \ldots & \beta_1^{L-1} \\ 1 & \beta_2 & \beta_2^2 & \ldots & \beta_2^{L-1} \\ \vdots & \vdots & & & \vdots \\ 1 & \beta_L & \beta_L^2 & \ldots & \beta_L^{L-1} \end{bmatrix}$$

$$A = \begin{bmatrix} \alpha_1 & 0 & \ldots & 0 \\ 0 & \alpha_2 & \ldots & 0 \\ \vdots & & \ddots & \vdots \\ 0 & 0 & \ldots & \alpha_L \end{bmatrix}$$

$$\Sigma = \begin{bmatrix} \Sigma_1 & \Sigma_2 & \ldots & \Sigma_L \\ \Sigma_2 & \Sigma_3 & \ldots & \Sigma_{L+1} \\ \vdots & & & \vdots \\ \Sigma_L & \Sigma_{L+1} & \ldots & \Sigma_{2L-1} \end{bmatrix}$$

If $L>N$, then some $\alpha_m$ on the diagonal of matrix A must be zero, and hence, det $A=0$ which implies det $\Sigma=0$. It follows that the number of targets 16 is equal to the order of the largest square matrix $\Sigma$ which is nonsingular. Therefore, by examining, in decreasing order, the nonsingularity of the matrices $\Sigma$ of the form given above, the number of targets 16 is determined. Assuming that the number of targets 16 has been determined, it can be assumed without loss of generality, that $N=L$.

Next, the matrix V above is the Vandermonde matrix whose determinant is given by:

$$\det V = \prod_{1 \leq i < j \leq N} (\beta_j - \beta_i)$$

Hence, if the targets 16 have different velocities (modulo PRF/$M_1$), then $$\beta_j \neq \beta_i$$

and V is nonsingular. Then
$$\Sigma^{-1} = V^{-1} A^{-1} V^{T-1}$$

$$A^{-1} = V \Sigma^{-1} V^T \quad (7)$$

Similarly, the $2L-1$ equations $$\Sigma_i = \beta_1^{i-1} a_1 + \beta_2^{i-1} a_{21} + \ldots + \beta_N^{i-1} a_N$$

where $i=3,4,\ldots,2L+1$, can be written in matrix form as follows:

$$U^T A U = \Sigma'$$

where $$U = \begin{bmatrix} \beta_1 & \beta_1^2 & \ldots & \beta_1^N \\ \beta_2 & \beta_2^2 & \ldots & \beta_2^N \\ \vdots & \vdots & & \vdots \\ \beta_N & \beta_N^2 & \ldots & \beta_N^N \end{bmatrix}$$

-continued $$\Sigma' = \begin{bmatrix} \Sigma_3 & \Sigma_4 & \ldots & \Sigma_{N+2} \\ \Sigma_4 & \Sigma_5 & \ldots & \Sigma_{N+3} \\ \vdots & \vdots & \ddots & \vdots \\ \Sigma_{N+2} & \Sigma_{N+3} & \ldots & \Sigma_{2N+1} \end{bmatrix}$$

The matrix U may be written as:

$$U = \begin{bmatrix} \beta_1 & 0 & \ldots & 0 \\ 0 & \beta_2 & \ldots & 0 \\ \vdots & \vdots & \ddots & \vdots \\ 0 & 0 & \ldots & \beta_N \end{bmatrix} \begin{bmatrix} 1 & \beta_1 & \beta_1^2 & \ldots & \beta_1^{N-1} \\ 1 & \beta_2 & \beta_2^2 & \ldots & \beta_2^{N-1} \\ \vdots & \vdots & \vdots & \ddots & \vdots \\ 1 & \beta_N & \beta_N^2 & \ldots & \beta_N^{N-1} \end{bmatrix}$$

Therefore, both U and $\Sigma'$ are nonsingular, and $$A^{-1} = U\Sigma'^{-1}U^T \quad (8)$$

Equation (7) implies that for $m = 1, 2, \ldots, N$ $$\begin{aligned}(A^{-1})_{mm} &= (V\Sigma^{-1}V^T)_{mm} \\ &= \sum_{i,j}(\Sigma^{-1})_{ij}V_{mi}V_{jm}^T \\ &= \sum_{i,j}(\Sigma^{-1})_{ij}V_{mi}V_{mj}\end{aligned}$$

But $$V_{mi} = \beta_m^{i-1}$$

hence, $$(A^{-1})_{mm} = \sum_{i,j}(\Sigma^{-1})_{ij}\beta_m^{i+j-2} \quad (9)$$

Similarly, using equation (8) to obtain:

$$(A^{-1})_{mm} = \sum_{i,j}(\Sigma'^{-1})_{ij}\beta_m^{i+j} \quad (10)$$

since $$U_{mi} = \beta_m^i$$

Equations (9) and (10) imply that $\beta$'s satisfy the following polynomial of order 2N:

$$\sum_{i,j}\{(\Sigma'^{-1})_{ij}\beta^{i+j} - (\Sigma^{-1})_{ij}\beta^{i+j-2}\} = 0$$

or $$a_{2N}\beta^{2N} + a_{2N-1}\beta^{2N-1} + \ldots + a_1\beta + a_0 = 0$$

where $$a_k = \sum_{i+j=k}(\Sigma'^{-1})_{ij} - \sum_{i+j=k+2}(\Sigma^{-1})_{ij}$$

The polynomial above have 2N roots, the $\beta$'s are those N roots which also must satisfy:

$$(A^{-1})_{mm} = \sum_{i,j}(\Sigma^{-1})_{ij}\beta_m^{i-j}\beta_n^{j-1} = 0$$

for $m \neq n$.

Once the $\beta$'s are computed, the matrix A, i.e., the $\alpha$'s are readily determined. The velocities $\dot{R}_i$ are determined (mod PRF/$M_1$) by using the equation:

$$\beta_i = e^{j\phi i} = e^{j2\pi(-\frac{2}{\lambda})\frac{\dot{R}_i}{PRF/M_1}}$$

Now, for the difference channel, $$V^T tA \ V = \Delta$$

$$(tA)^{-1} = V\Delta^{-1}V^T$$

where $$tA = \begin{bmatrix} t_1\alpha_1 & 0 & \ldots & 0 \\ 0 & t_2\alpha_2 & \ldots & 0 \\ \vdots & \vdots & \ddots & \vdots \\ 0 & 0 & \ldots & t_N\alpha_N \end{bmatrix}$$

and $$\Delta = \begin{bmatrix} \Delta_1 & \Delta_2 & \ldots & \Delta_N \\ \Delta_2 & \Delta_3 & \ldots & \Delta_{N+1} \\ \vdots & \vdots & \ddots & \vdots \\ \Delta_N & \Delta_{N+1} & \ldots & \Delta_{2N-1} \end{bmatrix}$$

The matrix tA is computed using V and $\Delta$. The angle discriminants $t_i$ are then computed using the diagonal elements of A and tA.

If some of the targets 16 are on boresight, then $t_i = 0$ for some "i", and the matrices tA and $\Delta$ are singular. In this case, the exact process used in the sum channel is repeated for the difference channel to determine the largest square matrix $\Delta$ that is nonsingular, to then obtain a polynomial in $\beta$ of order (2N-Null), where "Null" is the number of targets 16 that are on boresight The solutions $\beta$'s of this (2N-Null)-order polynomial are a subset of those $\beta$'s computed used the sum channel, and they corresponding to those targets 16 that are not on boresight. Once these $\beta$'s are solved, the nonzero angle discriminants are readily calculated.

Note that the only requirement for the existence of solutions is that the targets 16 do not have exactly the same velocity. If some of the targets 16 have exactly the same Doppler frequency then they are considered as one target 16 and the resulting tracking measurements are relative to their centroid. The method also does not depend on the off-boresight angle of the targets 16, i.e., they may be at the same angle.

A computer simulation was used to evaluate performance of the two above-described methods. Under infinite signal-to-noise ratio (SNR) conditions, both methods yield extremely accurate estimates. Under finite SNR conditions, numerical computations can result in large errors. For two-target scenarios, depending on the relative phase between individual signals or between composite signals of adjacent Doppler filters 13, the error might be large. The second method which is used for multiple target scenarios is much more sensitive to numerical errors, since, unlike the first method where only a quadratic equation needs to be solved, a high order polynomial is solved numerically. In addition, inversion of two large matrices is required to obtain the coefficients of this high order polynomial.

The performance against two-target scenarios was evaluated using a computer simulation assuming that the true angle off-boresight of the targets 16 are: $\epsilon_1 = 20$ mrad and $\epsilon_2 = -15$ mrad, the target sum signal phases, $\phi_1$ and $\phi_2$, are randomized for each processing phase, and target scintillation is modeled as first-order Markov process with a decay time constant equal to 3 seconds. Six different cases were simulated assuming different target signal strengths and velocities. In the simulation, the targets 16 are nominally placed at equal distance from the velocity gate center (VGC). However, target velocities and VGC can fluctuate up to 2 ft/sec about their nominal values. Also, the individual target signal strength given is the signal that would have been received if only that target 16 was present and it is on boresight and at the center of the Doppler filter 13.

One hundred (100) processing phases are generated for each case. The results are shown in Table 1. As was described above, the method yields two distinct real solutions if the sum channel signal outputs of Doppler filters k and k+1 are not aligned. Thus, in the simulation, an angle check of 10 degrees is used, i.e., solutions are computed only if the relative phase (modulo 180) of the two sum channel signals is larger than 10 degrees. In addition, to reduce noise corruption, a signal-to-noise ratio of 10 dB is required for both of the sum channel signals.

In Table 1, the first column shows the difference in velocities of the targets 16, the second column shows the number of processing phases which are used in the computation of the mean and standard deviation, and the last four columns show the mean and standard deviation of the estimated angles off-boresight.

TABLE 1

Simulation Results
for the Conditions: $SNR_1 > 10$ dB, $SNR_2 > 10$ dB, Relative Phase $> 10$ Degrees

| $\Delta\dot{R}$ (ft/sec) | NPHASE | $\epsilon_1$ (mrad) | $\sigma_{\epsilon_1}$ (mrad) | $\epsilon_2$ (mrad) | $\sigma_{\epsilon_2}$ (mrad) |
|---|---|---|---|---|---|
| | | $SNR_1 = 30$ dB | | $SNR_2 = 25$ dB | |
| 8 | 68 | 19.93 | 0.91 | −14.19 | 3.02 |
| 12 | 50 | 19.96 | 1.06 | −14.95 | 3.69 |
| 16 | 46 | 20.23 | 0.86 | −15.30 | 3.06 |
| | | $SNR_1 = 25$ dB | | $SNR_2 = 20$ dB | |
| 8 | 67 | 19.64 | 3.43 | −12.51 | 8.97 |
| 12 | 49 | 18.89 | 4.06 | −13.39 | 10.85 |
| 16 | 42 | 19.88 | 3.50 | −13.40 | 11.44 |

The number of phases used in the computation of the mean and standard deviation of the estimated angles off-boresight is only roughly 50% of the total phases. This is due to the signal-to-noise (>10 dB) and angle (>10 degrees) checks. Since the targets 16 are not positioned at the center of Doppler filters 13 and not on boresight, their signal strengths (up to 8 dB in some cases) are attenuated. Also, depending on their relative phase, these signals may partially cancel each other, and the resulting composite signals may fall below the 10 dB threshold. In addition, even though the target signals have random phases, the phases of the two composite signal outputs of Doppler filters k and k+1 are correlated, and depending on target signal strengths and their positions relative to the center of Doppler filters 13 this relative phase may be less than 10 degrees regardless of the individual target phases. For example, if the outputs of Doppler filter k and k+1 are:

$$\Sigma(k) = A_1 e^{j\phi_1} + A_2 e^{j\phi_2}$$

$$\Sigma(k+1) = \alpha_1 A_1 e^{j\phi_1} + \alpha_2 A_2 e^{j\phi_2}$$

where $A_i$ are target signal strengths and $\alpha_i$ are the attenuation due to the frequency response of Doppler filter, then the relative phase $\phi$ of $\Sigma(k)$ and $\Sigma(k+1)$ is approximately 180 degrees independent of $\phi_1$ and $\phi_2$ for the case where $A_1 \sim A_2$ and $\alpha_1 \sim \alpha_2$.

Figure 4:
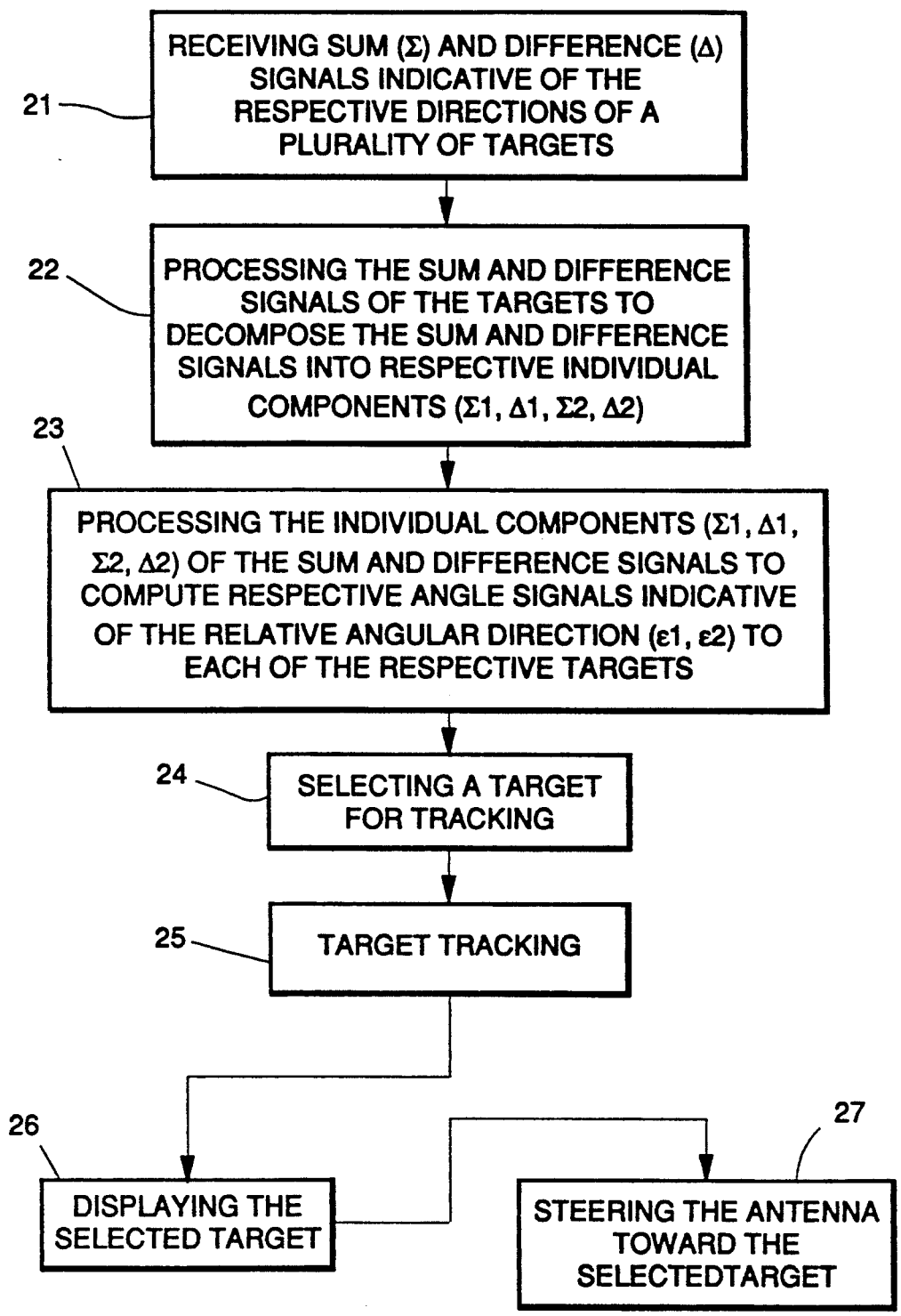
FIG. 4 is a flow chart illustrating processing methods in accordance with the principles of the present invention.

FIG. 4 is a flow chart illustrating processing methods 20 in accordance with the principles of the present invention. The first step 21 comprises receiving sum ($\Sigma$) and difference ($\Delta$) signals indicative of respective directions of a plurality of targets 16. The second step 22 comprises processing the sum and difference signals of the targets 16 to decompose them into respective individual components ($\Sigma_1$, $\Delta_1$, $\Sigma_2$, $\Delta_2$). The third step 23 comprises processing the individual components ($\Sigma_1$, $\Delta_1$, and $\Sigma_2$, $\Delta_2$) of the sum and difference signals to compute respective angle signals indicative of the relative angular direction ($\epsilon_1$, $\epsilon_2$) to each of the respective targets 16. The fourth step 24 comprises selecting a target 16 for tracking. The fifth step 25 comprises tracking the selected target 16. The sixth step 26 comprises displaying the tracked target 16. The seventh step 27 optionally comprises steering the antenna 11 toward the selected target 16.

Thus there has been described new and improved target angle measurement and tracking apparatus and methods which can isolate and track a selected target in a multiple-target environment. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A method of tracking a selected target in a multiple-target environment using a radar system, said method comprising the steps of:
   receiving sum ($\Sigma$) and difference ($\Delta$) signals indicative of respective directions of a plurality of targets;
   processing composite sum and difference signals from output energy of two adjacent Doppler filters of a single target's frequency spectrum of the targets to decompose the sum and difference signals into respective individual components ($\Sigma_1$, $\Delta_1$, and $\Sigma_2$, $\Delta_2$);
   processing the individual components ($\Sigma_1$, $\Delta_1$, and $\Sigma_2$, $\Delta_2$) of the sum and difference signals to compute respective angle signals indicative of the relative angular direction ($\epsilon_1$, $\epsilon_2$) to each of the respective targets;
   determining a number of targets in the multiple-target environment;
   selecting a target for tracking;
   maintaining a stable track on a selected target using a Kalman filter tracker; and
   displaying the selected target.

2. The method of claim 1 wherein the radar system comprises a moveable antenna, and wherein the method further comprises the step of steering the moveable antenna toward the selected target to track the selected target.

3. The method of claim 1 further comprising the step of transmitting radar signals towards a plurality of targets to obtain the sum ($\Sigma$) and difference ($\Delta$) signals derived from the respective plurality of targets.

4. The method of claim 2 further comprising the step of transmitting radar signals towards a plurality of targets to obtain the sum ($\Sigma$) and difference ($\Delta$) signals derived from the respective plurality of targets.

5. Radar apparatus for tracking a selected target in the presence of multiple targets, said apparatus comprising:

antenna means for receiving sum ($\Sigma$) and difference ($\Delta$) signals indicative of respective directions of a plurality of targets;

filtering means for processing the sum and difference signals of the targets to decompose the sum and difference signals into respective individual components ($\Sigma_1$, $\Delta_1$, and $\Sigma_2$, $\Delta_2$) from output energy of two adjacent Doppler filters of a single target's frequency spectrum;

angle processing means for processing the individual components ($\Sigma_1$, $\Delta_1$, and $\Sigma_2$, $\Delta_2$) of the sum and difference signals to compute respective angle signals indicative of the relative angular direction ($\epsilon_1$, $\epsilon_2$) to each of the respective targets;

determining means to evaluate a number of targets of said multiple targets;

selection means for selecting a target for tracking;

maintaining a stable track on a selected target using a Kalman filter tracker; and control means coupled to the antenna means for steering the antenna means toward the selected target to track the target.

6. The apparatus of claim 5 wherein the radar apparatus comprises a moveable antenna, and wherein the control means comprises means for steering the moveable antenna toward the selected target in response to the computed angle signals to track the selected target.

7. Radar apparatus comprising a moveable antenna for tracking a selected target in the presence of multiple targets that are closely spaced in Doppler frequency, said apparatus comprising:

antenna means for receiving sum ($\Sigma$) and difference ($\Delta$) signals indicative of respective directions of a plurality of targets;

filtering means for processing the sum and difference signals of the targets to decompose the sum and difference signals into respective individual components ($\Sigma_1$, $\Delta_1$, $\Sigma_2$, $\Delta_2$) from output energy of two adjacent Doppler filters of a single target's frequency spectrum;

angle processing means for processing the individual components ($\Sigma_1$, $\Delta_1$, and $\Sigma_2$, $\Delta_2$) of the sum and difference signals to compute respective angle signals indicative of the relative angular direction ($\epsilon_1$, $\epsilon_2$) to each of the respective targets;

determining means to evaluate a number of targets of said multiple targets;

selection means for selecting a target for tracking;

maintaining a stable track on a selected target using a Kalman filter tracker; and control means coupled to the antenna means for steering the antenna means toward the selected target to track the target.

* * * * *